United States Patent [19]

Tahara et al.

[11] 4,129,868
[45] Dec. 12, 1978

[54] RADAR BEACON APPARATUS

[75] Inventors: Kiyokazu Tahara; Keigo Kotoh, both of Amagasaki, Japan

[73] Assignee: Mitsubishi Denki Kabushiki Kaisha, Tokyo, Japan

[21] Appl. No.: 763,115

[22] Filed: Jan. 27, 1977

[51] Int. Cl.$^2$ .................................................. G01S 9/56
[52] U.S. Cl. .................................. 343/6.8 R; 325/116
[58] Field of Search ......... 343/6.5 SS, 6.8 R, 6.8 LC, 343/6.5 R, 6.5 LC; 325/116

[56] References Cited

U.S. PATENT DOCUMENTS

| | | | |
|---|---|---|---|
| 2,907,999 | 10/1959 | Wadley | 343/6.8 R X |
| 3,391,404 | 7/1968 | Vogelman | 343/6.8 R X |
| 3,546,695 | 12/1970 | Freedman | 343/6.8 R X |
| 3,967,202 | 6/1976 | Batz | 343/6.8 R X |

*Primary Examiner*—S. C. Buczinski
*Attorney, Agent, or Firm*—Oblon, Fisher, Spivak, McClelland & Maier

[57] ABSTRACT

A radar beacon apparatus to be used in conjunction with a search radar during emergency rescue operations. The radar beacon apparatus includes a receiving unit for receiving and detecting a radar pulse wave; a gate signal generating unit for generating upon the detection of a radar pulse wave a gate signal having a specific time interval; a transmitting unit for transmitting a frequency modulated signal which linearly and repetitively changes frequency over a predetermined frequency band during the time interval of the gate signal; and a display unit for displaying the reception of a radar pulse wave. The frequency sweep of the FM signal transmitted by the radar beacon completely covers and overlaps the receiver bandwidth of a comparable search radar, with each beacon transmission having an identical phase and frequency characteristic with respect to prior beacon transmissions. In an emergency situation, the beacon FM transmission produces multiple frequency incursions within the bandpass of the search radar receiver. Due to the constant phase and frequency relationship of these incursions, they are detected and integrated by the search radar to produce a bright display indicative of the position of the radar beacon apparatus. Also, in one embodiment, under normal circumstances the radar beacon operates as a search radar with the beacon transmitter muted while the beacon apparatus displays received radar pulses.

5 Claims, 7 Drawing Figures

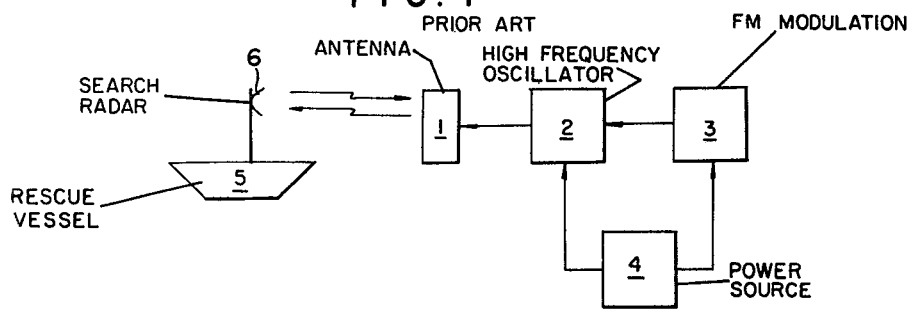
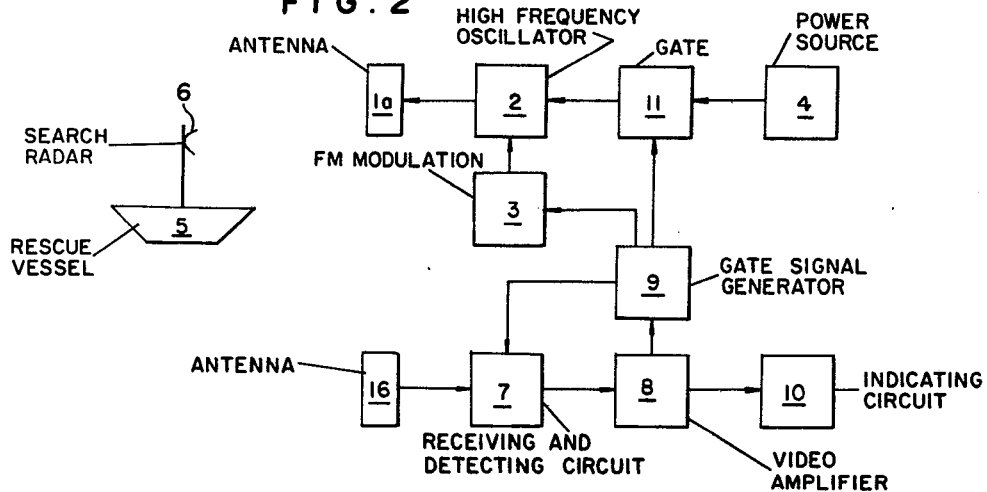
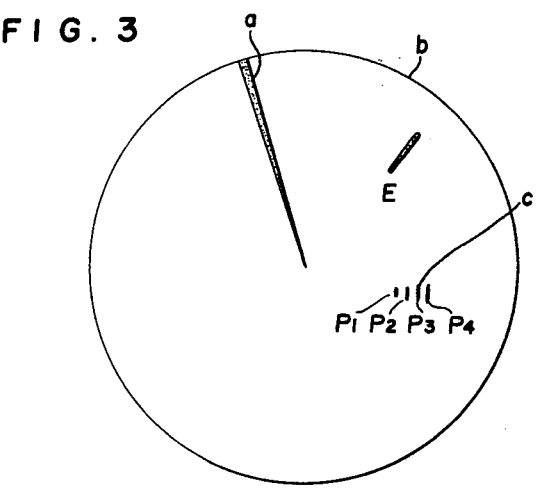

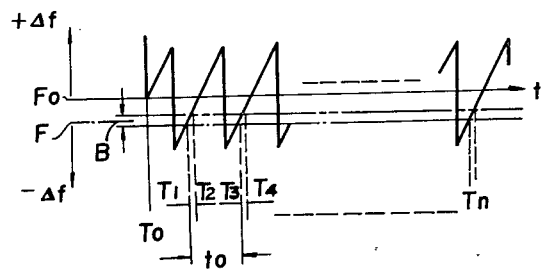
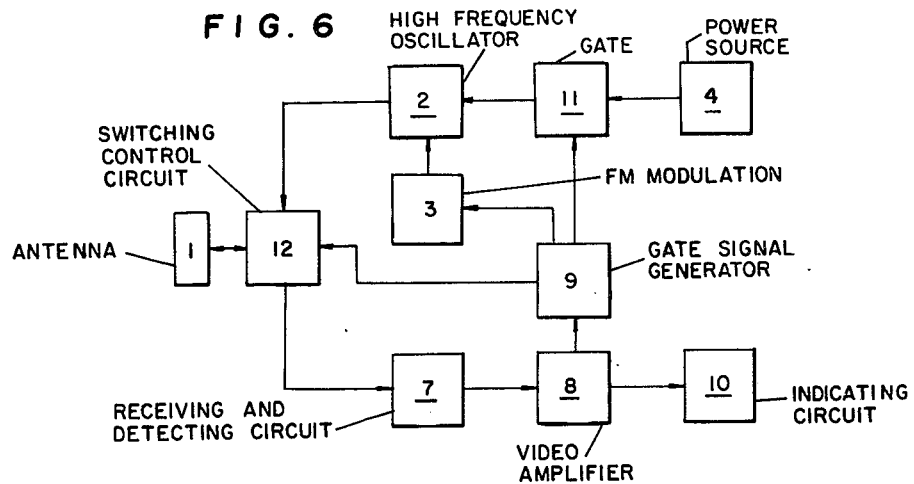
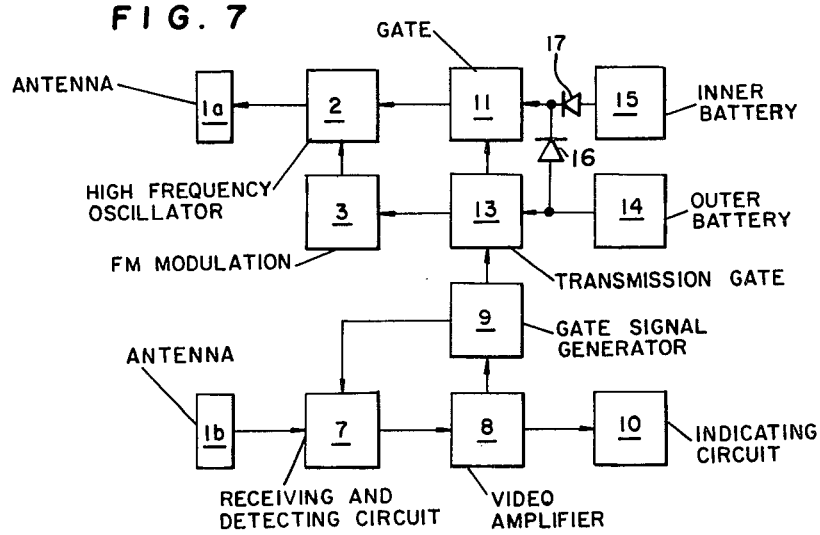

RADAR BEACON APPARATUS

BACKGROUND OF THE INVENTION

1. Field of the Invention

The present invention relates to a radar beacon apparatus used for position location during emergency rescue operations.

2. Description of the Prior Art

In the past, radar wave reflectors such as a corner reflector have been considered for the radar beacon application.

However, large background noises caused by reflections off ground and sea surfaces necessitated a larger and larger radar wave reflector and related passive radar apparatus to identify the ordinary echo of a ship or and echo in distress.

In order to overcome this disadvantage, active beacon systems have been proposed. A typical active beacon system is seen in FIG. 1 to consist of a small size high frequency oscillator (2), such as a high frequency diode oscillator, connected to an antenna (1), a FM modulation signal source (3) for varying the oscillating frequency of the high frequency oscillator (2) and a power source (4) for operating these devices. The high frequency signal which is generated by the high frequency oscillator (2) and the FM modulation signal source (3), is included in the carrier frequency fo the pulse modulation type search radar (6) provided on a search and rescue vessel (5). The repeat cycle of the FM modulation signal has a desired value relative to the repeat frequency and pulse width of the pulse modulation wave of the radar wave, and the bright lines (a) of FIG. 3 indicate the direction of the target on a radar display of the search radar (6).

In the beacon system of FIG. 1, it is therefore seen that the direction for search can be determined by the bright lines (a) of FIG. 3, however it is difficult to isolate the position of the target on the bright lines. Furthermore, since this is a continuous oscillating type apparatus, even though a small size high frequency oscillator can be used, the load to the power source (4) is remarkably high and a large size power source is disadvantageously required for operation over a long time period.

SUMMARY OF THE INVENTION

Accordingly, one object of the present invention is to provide a compact radar beacon apparatus for response.

Another object of the present invention is to provide a compact radar beacon apparatus which is actuated only for effective radar beacon operation periods and utilizes an integrated effect of an indicator in a search radar side to remarkably reduce the load on a power source.

Yet another object of the present invention is to provide a radar beacon apparatus which receives and detects a radar wave in a receiving unit generates a gate signal upon detection of a received radar wave, and transmits during the gate signal a frequency modulated signal which linearly and repetitively sweeps within the bandwidth of the receiver of a comparable search radar.

A further object of the present invention is to provide the radar beacon apparatus which includes a display unit for indicating the reception of the radar wave and which normally merely indicates the reception of the radar wave, but which is capable of transmitting the frequency modulation signal from the transmitting unit at a desired time.

These and other objects of this invention are achieved by providing a radar beacon apparatus to be used in conjunction with a search radar during emergency rescue operations. The radar beacon apparatus includes a receiving unit for receiving and detecting a radar pulse wave; a gate signal generating unit for generating upon the detection of a radar pulse wave a gate signal having a specific time interval; a transmitting unit for transmitting a frequency modulated signal which linearly and repetitively changes frequency over a predetermined frequency band during the time interval of the gate signal; and a display unit for displaying the reception of a radar pulse wave. The frequency sweep of the FM signal transmitted by the radar beacon completely covers and overlaps the receiver bandwidth of a comparable search radar, with each beacon transmission having an identical phase and frequency characteristic with respect to prior beacon transmissions. In an emergency situation, the beacon FM transmission produces multiple frequency incurisions within the bandpass of the search radar receiver. Due to the constant phase and frequency relationship of these incursions, they are detected and integrated by the search radar to produce a bright display indicative of the position of the radar beacon apparatus. Also, in one embodiment, under normal circumstances the radar beacon operates as a search radar with the beacon transmitter muted while the beacon apparatus displays received radar pulses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of the basic structure of the conventional simple radar beacon apparatus;

FIG. 2 is a block diagram of one embodiment of the radar beacon apparatus according to the present invention;

FIG. 3 is a pattern indicated on a radar PPI indication of a search radar;

FIGS. 4 and 5 is a view of waveforms illustrating the operations at main units;

FIG. 6 is a block diagram of another embodiment of the radar beacon apparatus; and FIG. 7 is a block diagram of the other embodiment of the radar beacon apparatus.

DETAILED DESCRIPTION OF THE PREFERRED EMBODIMENTS

Figure 4:
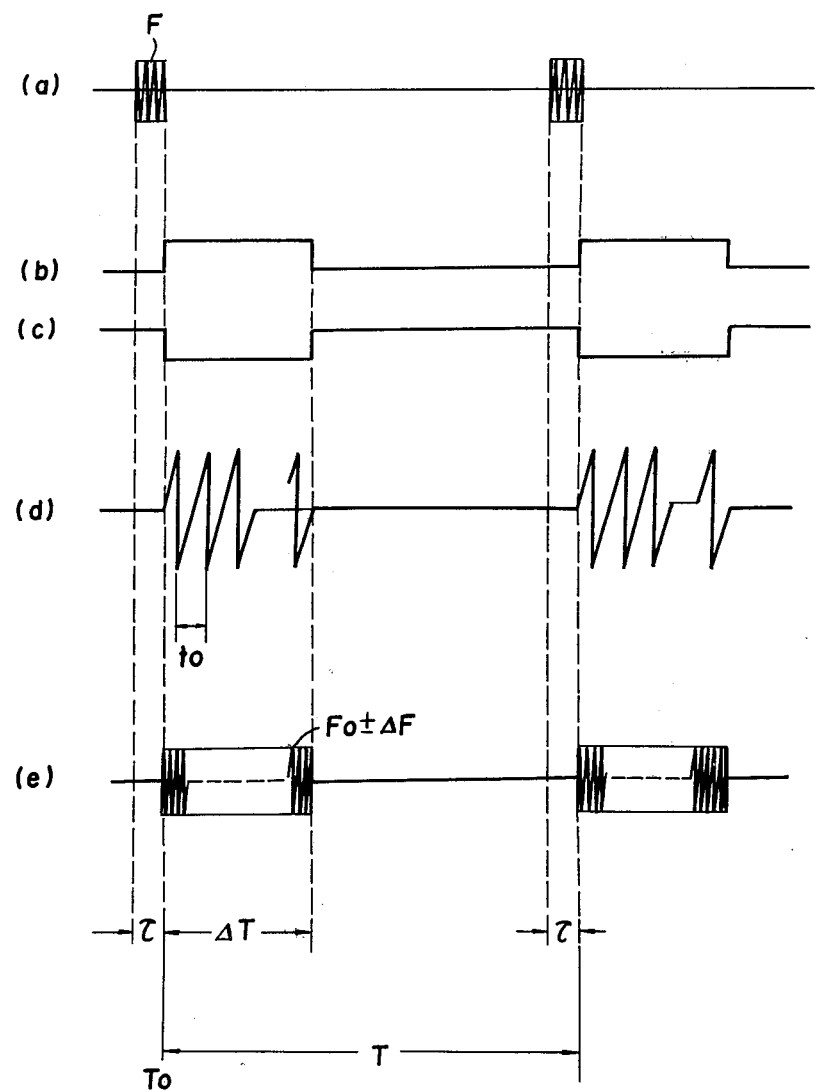

Referring now to the drawings, wherein like reference numerals designate identical or corresponding parts throughout the several views, and more particularly to FIG. 2 thereof, there is seen a receiving and detecting circuit (7) which receives and detects the radar wave of the search radar (6) impinging upon a receiving antenna (1b). The output of circuit (7) is passed to the video amplifier to obtain the modulated pulse wave signal of the search radar. The video amplifier (8) is connected to the gate signal generating circuit (9) which upon being triggered by the modulated search radar pulse wave generates a continuous gate signal for a constant time T (which is shorter than a pulse repeating cycle of a radar, that is, the period from the just after the radar pulse wave to the detection of the next pulse wave). The indicating circuit (10) is provided for indicating a detection of a modulated pulse wave signal. The indicating circuit (10) can be visual, e.g. a light emission display with a lamp light source, or aural, e.g. an acoustical indicator such as a speaker.

The output of the gate signal generating circuit (9) is fed to a gate circuit (11) between the high frequency oscillator (2) and the power source device (4). During the time interval of the gate signal, the power source device (4) is connected to the high frequency oscillator (2) to operate the high frequency oscillator (2).

The output gate signal generating circuit (9) is also fed to the FM modulation signal source (3) which then modulates the oscillation frequency of the high frequency oscillator (2) during the interval of the gate signal, and to the receiving and detecting circuit (7).

The FM modulation signal source (3) is controlled so as to begin the FM modulation waveform at the same phase at the start of each gate signal, and to thereby produce identical FM modulation waveforms during successive gate signals. In the receiving and detecting circuit (7), the negative bias labeled as (c) in FIG. 4 is applied to the detector to cut off the receiving and amplifying circuit, thereby decreasing power drain during the time interval of the gate signal. As a result, the receiving circuit (7) does not respond to newly received signals during the gate signal.

The high frequency oscillation output of the high frequency oscillator (2) is radiated in space through a transmitting antenna (1a). A part of this radiation reaches the receiver of the search radar (6).

The signal of the search radar (6) which has the waveform labeled (a) in FIG. 4, is received by an apparatus having the above-described structure. In FIG. 4, the reference F designates the carrier frequency of the wave of the search radar (10); $\tau$ designates a pulse width of the modulated pulse wave of the radar (6) and T designates a pulse repeating period.

The received radar pulse signal, FIG. 4(a), is passed through the receiving antenna (1b), the receiving and detecting circuit (7) and the video amplifier (8) and actuates the gate signal generating circuit (9). The continuous gate signal, FIG. 4b, is generated during the time interval $\Delta T$ from the time $T_0$ which is the end of the received radar pulse signal.

Likewise, the gated signal can be generated at any predetermined time interval between received radar pulses.

The gate signal is applied to the gate circuit (11) and enables oscillation of the high frequency oscillator (2) during the time interval of the gate signal. Simultaneously, the gate signal actuates the FM modulation signal source (3) which generates a modulating signal having the saw tooth waveform shown in FIG. 4(d). This waveform has a period, $t_o$ and a constant phase from the time $T_0$ for the interval $\Delta T$ is shown in FIG. 4(d).

As the FM modulation signal is received, the oscillation output of the high frequency oscillator (2) continues for the time interval $\Delta T$ from the time $T_0$ as shown in FIG. 4(e). During this interval, the FM oscillation output repeatedly and linearly changes $\pm \Delta F$ from the central frequency $F_0$ of the high frequency oscillator (2) in accordance with the modulating waveform of FIG. 4(d). The reference F designates ½ of the maximum width of the deviation of the FM frequency.

FIG. 5 shows the states of the FM wave in enlarged size wherein the frequency is given in ordinate and the time t is given in abscissa.

When the carrier frequency F of the search radar wave is in a range of $\pm \Delta F$ even though the frequency F is not the same as the central frequency $F_0$ of the high frequency oscillator (2), an effective signal is received by the radar search for the times $T_1$ to $T_2$, $T_3$ to $T_4$ ... which corresponds to the receiving band width B of the receiver in the search radar size (6). Therefore, upon reception by the search radar of the FM signal, several bright dots $P_1$, $P_2$, $P_3$ and $P_4$ are displayed on the search radar display, as shown in FIG 3(c). Since each beacon FM transmission begins at the same phase and the same frequency at time $T_0$, and since each beacon transmission is identically modulated, the times $T_0$ to $T_1$, $T_1$ to $T_3$ ... are always constant with respect to each radar pulse whereby an integrated effect for the bright dot display can be expected. The highly bright display can be expected relative to the output of the high frequency oscillator (2).

When the phases of the FM modulation signal are not the same for each beacon transmission, the bright dots are not synchronized at the same positions on the search radar display. Accordingly, the short bright lines are formed to indicate the position of the target by the end E of the bright lines as shown in FIG. 3(b). However, the integrated effect on the display can not be expected and therefore considerably more beacon transmissions would be required to produce a bright display. Furthermore, effective searchable range of the radar beacon apparatus is disadvantageously shortened because of the faint display of the out of phase beacon transmissions.

The indicating circuit (10) imparts the visual display or the acoustic indication upon receiving the signal of the search radar, whereby it is possible to note the fact that the search is being carried out near the position of the radar beacon apparatus.

FIG. 6 shows another embodiment of the radar beacon apparatus of the invention wherein one antenna is commonly used as the transmitting antenna and the receiving antenna. A switching control circuit (12) is connected to the feeding point of the antenna (1). In the normal condition, the receiver (7) is connected to the antenna (1). When the high frequency oscillator (2) is actuated, the gate signal of the gate signal generating circuit (9) is fed to the switching control circuit (12) which then switches and connects the high frequency oscillator (2) to the antenna (1).

FIG. 7 shows another embodiment of the radar beacon apparatus of the invention, which includes a transmission gate (13) for controlling the transmission of the gate signal of the gate signal generating circuit (9). The power source device includes an outer battery (14) which is the usual battery, an inner battery (15) which is a sea water battery actuated by immersion into sea water, and inverse current blocking diodes (16), (17). In the other parts, the like referneces designate the identical or corresponding parts in FIG. 2.

Under normal circumstances the radar beacon apparatus shown in FIG. 8 is operated by the outer battery (14), and the gate signal fed to the transmitting unit is blocked by the transmitting gate in order to prevent the transmission from the transmitting unit. At the time of the shipwreck, the outer battery (14) is disconnected and the inner battery (5) is immersed into the sea water. The gate signal of the gate signal generating circuit (9) then is applied through the transmission gate (13) to the transmitting unit to automatically generate and transmit the FM wave having the predetermined frequency sweeping.

When the radar beacon apparatus is equipped in a small leisure boat, the apparatus can be usually used as a search radar for indicating the approach to a ship indicating a distress situation. The apparatus can be also used as a radar beacon apparatus to effect a search operation in the case of accident of shipwreck.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a radar beacon apparatus used to communicate position location to a search radar during an emergency rescue operation, said search radar transmitting radar pulse waves of a particular pulse repitition period, detecting received beacon signals having frequencies within a specific bandwidth, and displaying said received beacon signals on a search radar PPI, the improvement comprising:
   receiver means for detecting said radar pulse waves of said search radar,
   gate signal generating means coupled to said receiver means for producing a gate signal in response to the detection by said receiver means of said radar pulse waves, said gate signal having a time interval less than said search radar pulse repetition period,
   transmitter means coupled to said gate signal generating means for generating and repetitively transmitting during said interval of said gate signal a frequency modulated signal which linearly sweeps frequency over a predetermined frequency band, said predetermined frequency band encompassing and overlapping said bandwidth of said search radar, said transmitter means furthermore maintaining a constant phase and frequency relationship between said frequency modulated signals generated during successive gate signals,
   whereby said radar beacon repetitively transmits during said gate period a plurality of beacon signals through said bandwidth of said search radar, said search radar detecting said plurality of beacon signals and integrating effects thereof to produce on said search radar PPI a bright pattern indicative of the position of said radar beacon.

2. In a radar beacon according to claim 1, the improvement further comprising:
   indicating means controlled by said gate signal for indicating the reception of said radar pulse.

3. In a radar beacon according to claim 1, the improvement further comprising:
   antenna means coupled to said transmitter means, said receiver means and said gate signal generating means; said antenna means comprising a switch control unit and a R. F. antenna, said switch control unit connecting said transmitter means to said antenna during said interval of said gated signal, and otherwise connecting said receiver means to said antenna in the absence of said gated signal.

4. In a radar beacon according to claim 1, the improvement further comprising:
   said frequency modulated signal of said transmitter means sweeping said predetermined bandwidth a predetermined number of times during said time interval of said gate signal.

5. In a radar beacon according to claim 1, the improvement further comprising:
   indicating means controlled by said gate signal for indicating the reception of said radar pulse, and
   a switching unit interposed between said transmitting means and said gate signalling means, said switching unit blocking said gated signal to said transmitter means under normal circumstances and passing said gated signal to said transmitter means during an emergency,
   whereby said radar beacon is used in a search radar mode or in a beacon mode depending upon the circumstances at the location of said radar beacon.

* * * * *